US012798381B2

(12) United States Patent
Park et al.

(10) Patent No.: US 12,798,381 B2
(45) Date of Patent: Nov. 17, 2026

(54) COCKPIT MODULE ASSEMBLY FOR VEHICLE

(71) Applicant: HYUNDAI MOBIS CO., LTD., Seoul (KR)

(72) Inventors: Jae Whoan Park, Yongin-si (KR); Seung Cheol Kim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 552 days.

(21) Appl. No.: 18/362,519

(22) Filed: Jul. 31, 2023

(65) Prior Publication Data

US 2024/0140202 A1 May 2, 2024

(30) Foreign Application Priority Data

Oct. 27, 2022 (KR) ........................ 10-2022-0140252

(51) Int. Cl.

*B60K 35/50* (2024.01)
*B60K 35/60* (2024.01)
*B60K 37/00* (2006.01)
*B60R 11/00* (2006.01)

(52) U.S. Cl.

CPC .............. *B60K 35/50* (2024.01); *B60K 35/60* (2024.01); *B60K 37/00* (2013.01); *B60R 2011/0005* (2013.01)

(58) Field of Classification Search

CPC ........ B60K 35/50; B60K 35/60; B60K 37/00; B60R 2011/0005

See application file for complete search history.

(56) References Cited

U.S. PATENT DOCUMENTS

2007/0019387 A1* 1/2007 Schipper ............. B60R 11/0252 361/825
2014/0153163 A1* 6/2014 Harding .................... B60R 7/06 361/679.01
2016/0204634 A1* 7/2016 Parlow ...................... B60R 7/06 320/114
2018/0178652 A1* 6/2018 Monroe ................... B60Q 3/80

* cited by examiner

*Primary Examiner* — Sunghyoun Park
(74) *Attorney, Agent, or Firm* — NSIP Law

(57) ABSTRACT

A cockpit module assembly for a vehicle is provided. The cockpit module assembly includes a cover panel disposed to face toward a ceiling surface of a vehicle and covering one side of an instrument panel, and a multifunction module detachably coupled to the cover panel and provided to display instrument information of the vehicle and/or hold portable device(s).

10 Claims, 6 Drawing Sheets

100: 120, 140

264: 264a, 264b, 264c

COCKPIT MODULE ASSEMBLY FOR VEHICLE

CROSS-REFERENCE TO RELATED APPLICATIONS

This application claims priority to and the benefit of Korean Patent Application No. 10-2022-0140252, filed on Oct. 27, 2022, the disclosure of which is incorporated herein by reference in its entirety.

BACKGROUND

1. Field

The present invention relates to a cockpit module assembly for a vehicle.

2. Description of Related Art

A cockpit module including an instrument panel for displaying instruments is installed in a vehicle. The cockpit module makes it difficult for a vehicle owner to rearrange components of the cockpit module or change the design arbitrarily after manufacturing of the vehicle is completed. In particular, in the case of the instrument panel that displays instruments, since each newly developed vehicle is developed in a different form, productivity is reduced due to an increase in manufacturing period and manufacturing costs.

SUMMARY

In an aspect of the disclosure, a cockpit module assembly for a vehicle includes a cover panel disposed to face toward a ceiling surface of a vehicle and covering one side of an instrument panel, and a multifunction module detachably coupled to the cover panel and provided to display instrument information of the vehicle and/or hold portable device (s).

The cover panel may include a first cover disposed adjacent to a steering wheel, and a second cover disposed adjacent to a glove box. The first cover is disposed higher than the second cover in a direction from a floor surface of the vehicle to the ceiling surface.

The first cover may include a power supply disposed in a central portion thereof, and a first coupling part disposed on first and second sides of the power supply.

The power supply may include a first groove formed in a direction from an outer surface of the cover panel toward the floor surface of the vehicle, and a first conductor disposed in the first groove and protruding toward an open side of the first groove.

The first coupling part may include a hole formed to pass through the cover panel, and a holder disposed in the hole. The holder may include a support frame coupled to the hole, and a holding frame may be connected to the support frame and disposed inside the cover panel.

The multifunction module may include a main body in contact with the cover panel, holding parts disposed on an outer surface of the main body and adapted to hold the one or more portable devices, a second coupling part disposed on both sides of the main body and coupled to the first coupling part, and a second conductor disposed on a surface of the main body in contact with the cover panel, the second conductor disposed in the first groove and coupled to the first conductor.

The second coupling part may include a second groove formed inward of the main body, a knob disposed inside the second groove, a support block disposed inside the second groove and supporting the knob, and a spring disposed inside the second groove and disposed on one side of the knob to move in conjunction with movement of the knob.

The knob may include a first body disposed inside the second groove and exposed to an outside of the main body, a second body disposed inside the second groove and protruding from an inside of the second groove to the outside of the main body, and a third body provided in a bent shape at an end portion of the second body and movably disposed inside the holder of the first coupling part.

In another aspect of the disclosure, a multifunction module is provided for a vehicle, the vehicle including a cover panel disposed to face toward a ceiling surface of the vehicle and covering a side of an instrument panel. The multifunction module includes a main body detachably attachable to the cover panel, the multifunction module is adapted to display instrument information of the vehicle and/or hold portable device(s), holding parts disposed on an outer surface of the main body and adapted to hold the portable device and/or the instrument, coupling parts disposed on sides of the main body for attachment to the cover, and a conductor disposed on a surface of the main body such that upon attachment of the multifunction module to the cover, the conductor of the multifunction module is connected to the conductors of the cover panel. The cover panel is electrically connected to the vehicle and the portable devices are able to receive power via the cover panel.

The coupling parts may include a groove formed inward of the main body, a knob disposed inside the groove, a support block disposed inside the groove and supporting the knob, and a spring disposed inside the groove and disposed on one side of the knob to move in conjunction with movement of the knob.

The knob may include a first body disposed inside the groove and exposed to an outside of the main body, a second body disposed inside the groove and protruding from an inside of the groove to the outside of the main body, and a third body provided in a bent shape at an end portion of the second body and movably disposed inside a holder of a coupling part of the cover panel.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION

Figure 1:
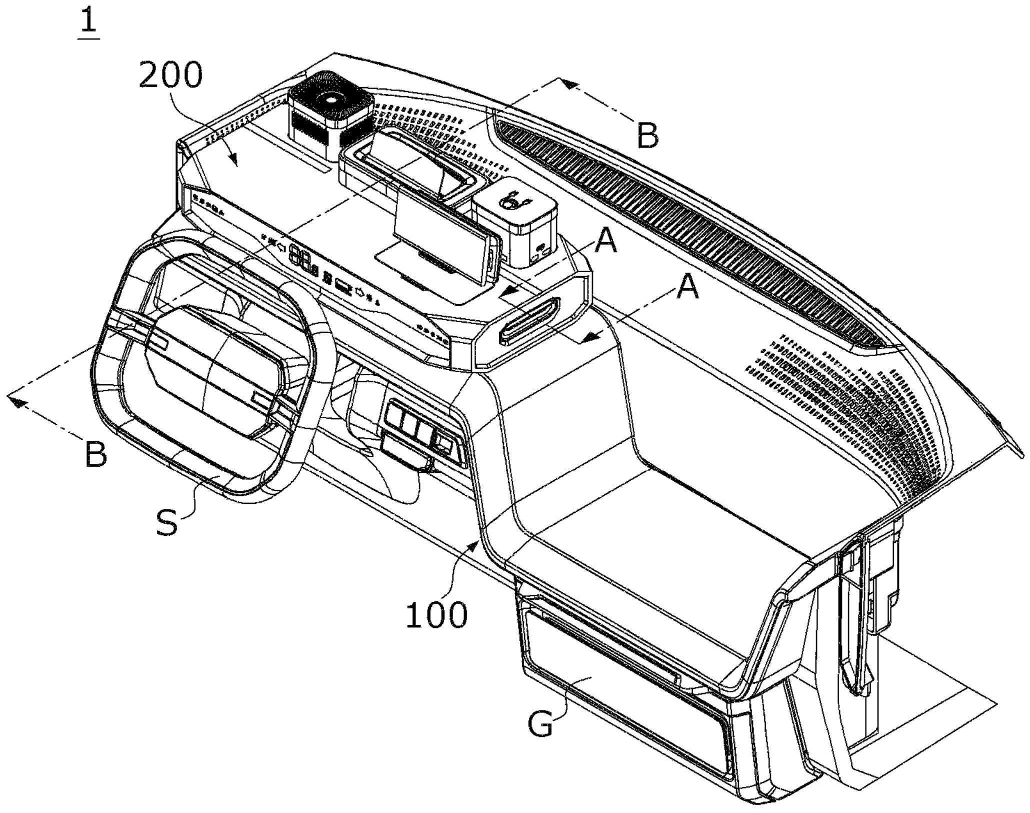
FIG. 1 is a view illustrating a cockpit module assembly for a vehicle according to an embodiment of the present invention.

Since the present invention can undergo various changes and have various embodiments, specific embodiments are illustrated and described in the drawings. However, this is not intended to limit the present invention to specific embodiments, and should be understood to include all modifications, equivalents, and substitutes included in the spirit and scope of the present invention.

Terms including ordinal numbers, such as first and second, may be used to describe various components, but the components are not limited by the terms. These terms are only used for the purpose of distinguishing one component from another. For example, a second element may be called a first element, and similarly, a first element may be called a second element, without departing from the scope of the present invention. The term and/or includes a combination of a plurality of related recited items or any one of a plurality of related recited items.

It should be understood that when one element is referred to as being "connected" or "coupled" to the other element, it may be directly connected or coupled to the other element, or other elements may be present therebetween. On the other hand, when an element is referred to as "directly connected" or "directly coupled" to another element, it should be understood that no other element is present therebetween.

In the description of the embodiment, in the case where one component is described as being formed "on or under" the other component, "on or under" includes both of the case in which there is direct contact between two components and the case in which there are one or more other components present between the two components. In addition, when expressed as "on or under," it may include the meaning of not only the upward direction but also the downward direction based on one component.

Terms used in this application are only used to describe specific embodiments and are not intended to limit the present invention. Singular expressions include plural expressions unless the context clearly dictates otherwise. In this application, terms such as "comprise" and "having" are intended to designate the presence of a feature, number, step, operation, component, part, or combination thereof described in the specification, but it should be understood that the possibility of the presence or addition of one or more features, numbers, steps, operations, components, parts, or combinations thereof is not precluded.

Unless defined otherwise, all terms used herein, including technical or scientific terms, have the same meaning as commonly understood by one of ordinary skill in the art to which the present invention belongs. Terms such as those defined in commonly used dictionaries should be interpreted as having a meaning consistent with the meaning in the context of the related art, and unless explicitly defined in this application, it should not be interpreted in an ideal or excessively formal meaning.

Hereinafter, a cockpit module assembly for a vehicle will be described in detail with reference to the accompanying drawings, but the same reference numbers will be assigned to the same or corresponding components regardless of drawing numbers, and overlapping descriptions thereof will be omitted.

Figure 2:
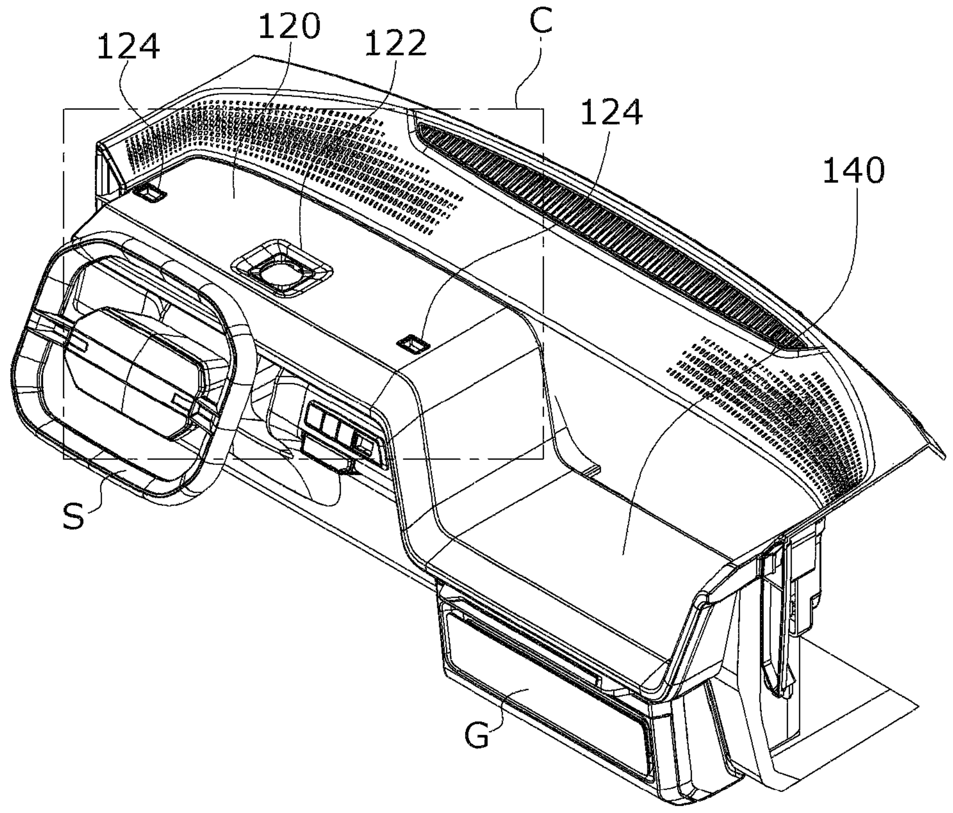
FIG. 2 is a view illustrating a cover panel.
Figure 3:
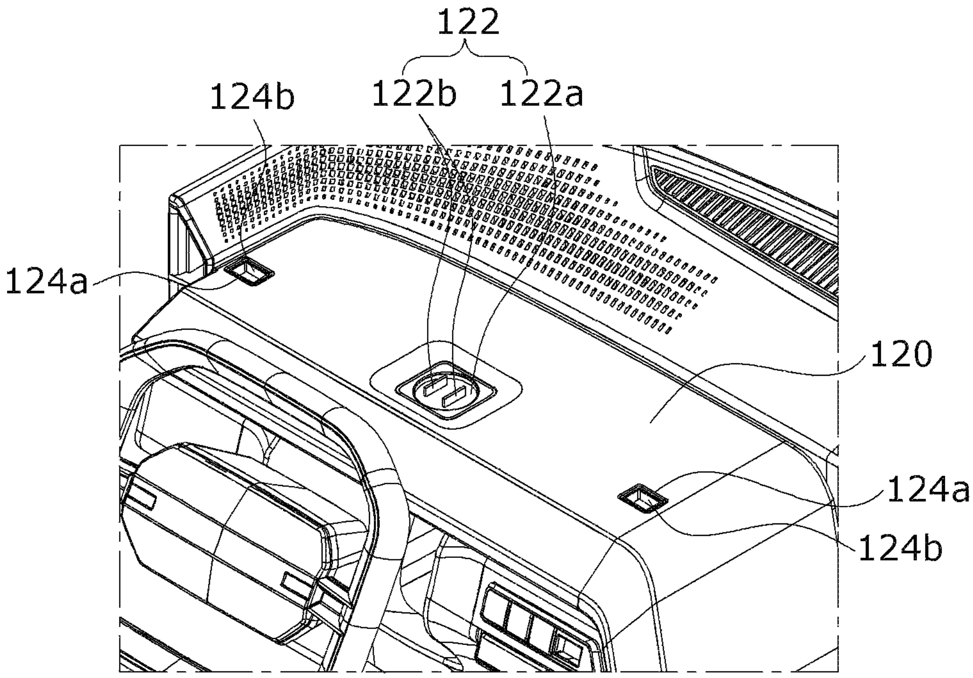
FIG. 3 is an enlarged view of part C of FIG. 2.
Figure 4:
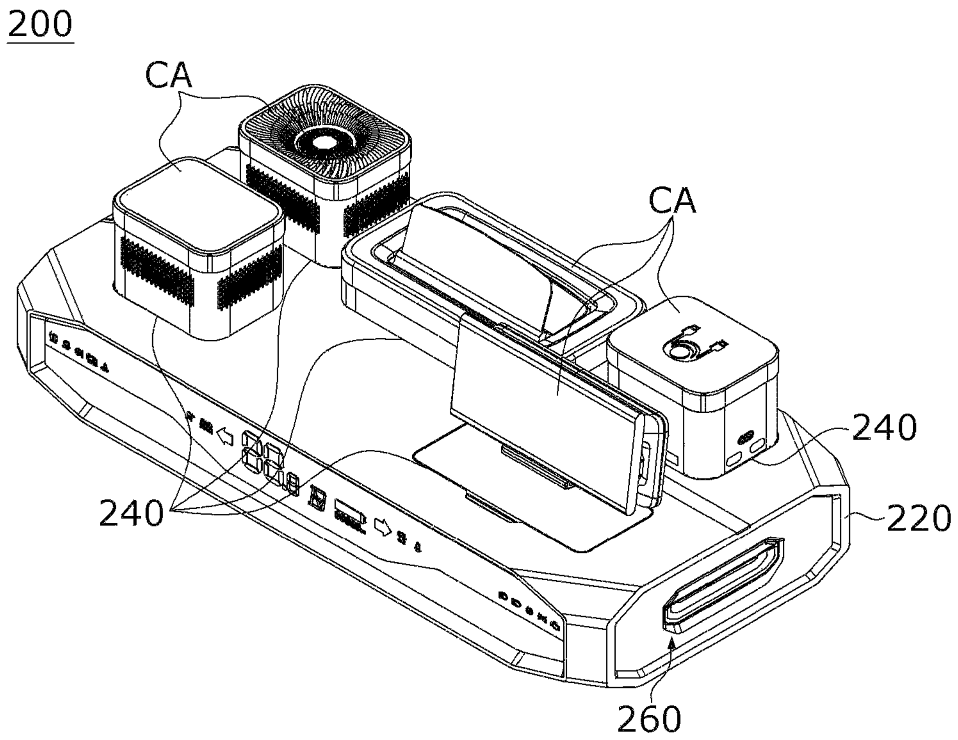
FIG. 4 is a perspective view of a multifunction module.
Figure 5:
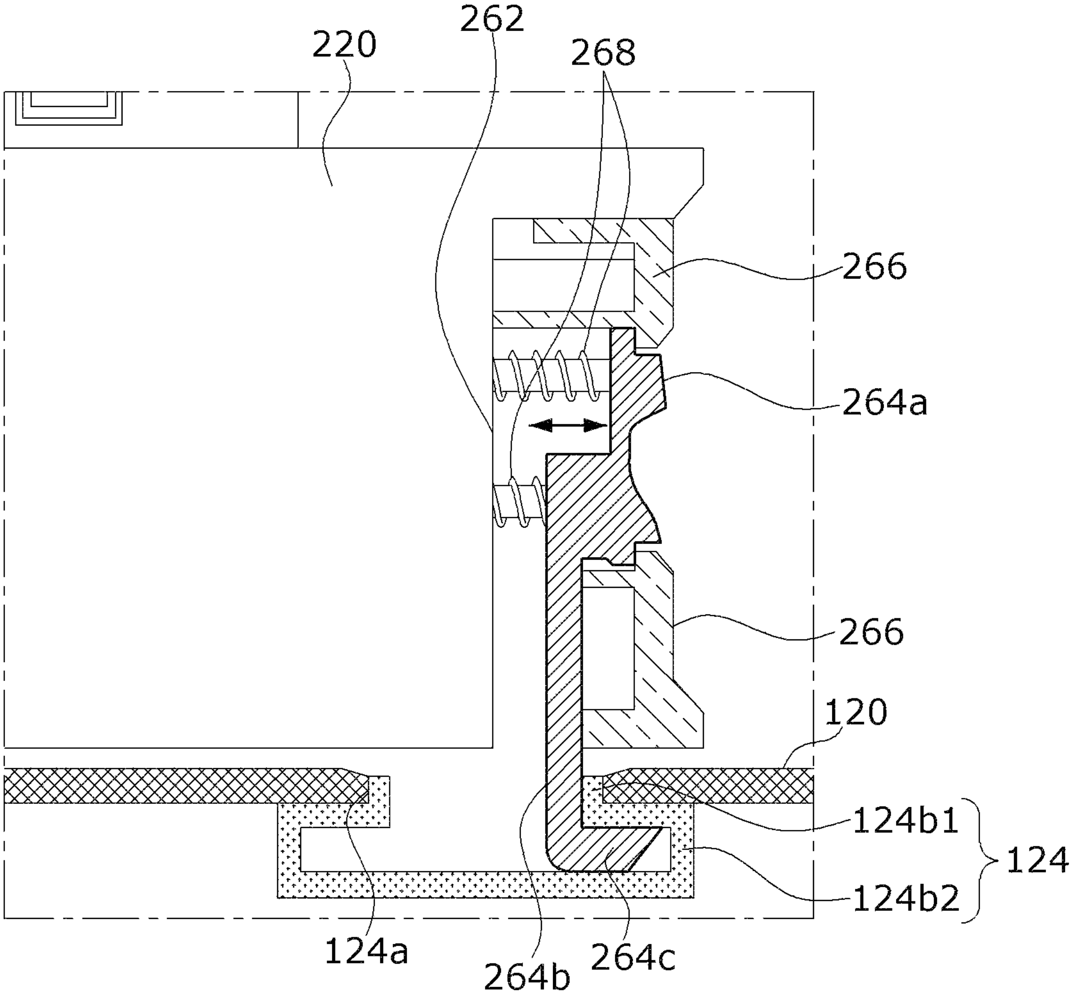
FIG. 5 is a cross-sectional view of the cockpit module assembly for a vehicle along line A-A of FIG. 1.
Figure 6:
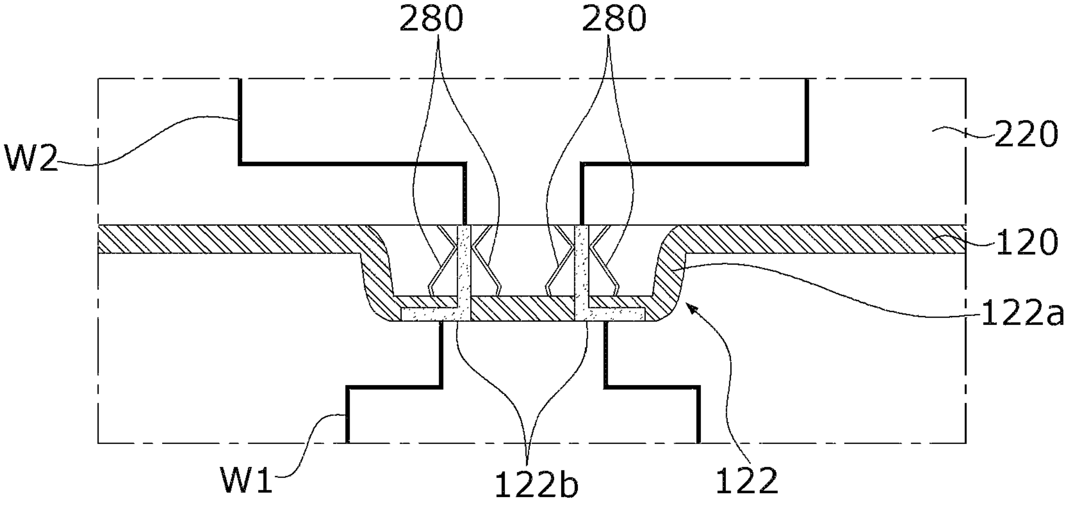
FIG. 6 is a cross-sectional view of the cockpit module assembly for a vehicle along line B-B of FIG. 1.

FIG. 1 is a view illustrating a cockpit module assembly for a vehicle according to an embodiment of the present invention, FIG. 2 is a view illustrating a cover panel, FIG. 3 is an enlarged view of part C of FIG. 2, FIG. 4 is a perspective view of a multifunction module, FIG. 5 is a cross-sectional view of the cockpit module assembly for a vehicle along line A-A of FIG. 1, and FIG. 6 is a cross-sectional view of the cockpit module assembly for a vehicle along line B-B of FIG. 1.

Referring to FIGS. 1 to 6, a cockpit module assembly 1 for a vehicle according to the embodiment of the present invention may include a cover panel 100 disposed to face a ceiling surface of a vehicle and covering one side of an instrument panel and a multifunction module 200 detachably coupled to the cover panel 100 and displaying an instrument or holding a portable device.

The cover panel 100 may be disposed in a passenger compartment of the vehicle. The cover panel 100 may have a stepped shape in which a stepped portion is formed. The cover panel 100 may cover one side (e.g., an upper side) of an instrument panel or glove box G.

The cover panel 100 may include a first cover 120 and a second cover 140.

The first cover 120 may be disposed adjacent to the steering wheel S. The first cover 120 may be disposed on the driver's seat side.

The first cover 120 may include a power supply 122 and a first coupling part 124.

The power supply 122 may be disposed in the central portion of the first cover 120. The power supply 122 may be electrically connected to the multifunction module 200. The power supply 122 may include a first groove **122*a* and a first conductor 122*b***.

The first groove **122*a* may be formed in a direction from the outer surface of the cover panel 100 corresponding to the first cover 120 toward the floor surface of the vehicle. The first groove 122*a* may be provided in a shape in which a cross-sectional area gradually decreases in a direction inward from the outer surface of the cover panel 100**.

The first conductor **122*b* may be disposed in the first groove 122*a*. The first conductor 122*b* may be bent while supported on the bottom of the first groove 122*a* and may protrude toward the open side of the first groove 122*a*. The bent portion of the first conductor 122*b* may pass through the bottom of the first groove 122*a* and may be disposed inside the first groove 122*a*. As shown in FIG. 6, the first conductor 122*b* may be connected to a first wire W1** disposed inside the instrument panel.

The first coupling part 124 may be disposed on one side and the other side of the power supply 122. The first coupling part 124 may include a hole **124*a* and a holder 124*b***.

The hole **124*a* may be formed to pass through the cover panel 100. The hole 124*a* may be provided in a quadrangular shape but is not limited thereto. The hole 124*a* may be disposed at each of one end portion and the other end portion of the first cover 120**.

The holder **124*b* may be disposed in the hole 124*a*. The holder 124*b* may include a support frame 124*b*1 and a holding frame 124*b*2**.

The support frame **124*b*1 may be coupled to the hole 124*a*. More specifically, the support frame 124*b*1 may be coupled to one surface of the cover panel 100 forming the hole 124*a*. Accordingly, the size of the rim of the outer surface of the support frame 124*b*1 may be smaller than or equal to the size of the hole 124*a***.

The holding frame **124*b*2 may be connected to the support frame 124*b*1. The holding frame 124*b*2 may be formed with a larger edge size than the support frame 124*b*1. Thus, the holding frame 124*b*2 may be brought into contact with and fixed to the inner surface of the cover panel 100. The holding frame 124*b*2 may include a combination of an upper frame connected to the support frame 124*b*1, a lower frame facing the upper frame, and a side frame connecting the upper frame and the lower frame. Accordingly, the holding frame 124*b*2** may have a hollow shape.

The second cover 140 is connected to the first cover 120. The second cover 140 may be disposed adjacent to the glove box G disposed inside the vehicle.

As shown in FIG. 2, the first cover 120 may be disposed higher than the second cover 140 in a direction from the floor surface to the ceiling surface of the vehicle. Therefore, the multifunction module 200 is not covered by the steering wheel S so that the user's field of vision of the multifunction module 200 can be prevented from being obstructed.

The multifunction module 200 may include a main body 220, a plurality of holding parts 240, a second coupling part 260 and a second conductor 280.

The main body 220 forms the exterior of the multifunction module 200. The main body 220 may be provided in a shape having a length in a direction from the first cover 120 to the second cover 140 of the cover panel 100. The main body 220 is in contact with the cover panel 100.

A plurality of holding parts 240 may be disposed on the outer surface of the main body 220. More specifically, the plurality of holding parts 240 may be disposed on a surface of the main body 220 facing the ceiling surface. The plurality of holding parts 240 may be disposed on the outer surface of the main body 220. More specifically, the plurality of holding parts 240 may be disposed on a surface of the main body 220 facing the ceiling surface. The plurality of holding parts 240 may have a groove shape concavely formed inward from an outer surface of the main body 220. Convenience devices CA may be mounted on the plurality of holding parts 240. The convenience device CA may include a humidifier, a dehumidifier, a charger, a mobile phone holder, a display holder, and the like. In addition, a charging pin connected to a power supply device disposed inside the vehicle may be installed in the plurality of holding parts 240. Accordingly, when the convenience device CA is mounted on the plurality of holding parts 240, wireless charging may be performed.

The second coupling part 260 may be disposed on both sides of the main body 220. The second coupling part 260 may be coupled to the first coupling part 124 of the cover panel 100.

The second coupling part 260 may include a second groove 262, a knob 264, and a spring 268.

The second groove 262 may be formed inward of the main body 220 from a surface forming both sides of the main body 220.

The knob 264 may be disposed inside the second groove 262. The knob 264 is coupled to the cover panel 100 while disposed inside the second groove 262 to detachably couple the multifunction module 200 to the cover panel 100.

The knob 264 may include a first body **264*a*, a second body 264*b*, and a third body 264*c***.

The first body **264*a* may be disposed inside the second groove 262. The first body 264*a* may be exposed to the outside of both sides of the main body 220 through the second groove 262. Accordingly, a user may push the first body 264*a*. To enable the user to easily push the first body 264*a*, the first body 264*a*** may have a shape with a concave inward central portion.

The second body **264*b* may be disposed inside the second groove 262. The second body 264*b* may protrude from the end of the first body 264*a* in a direction from the multifunction module 200 toward the cover panel 100. The second body 264*b* may protrude from the inside of the second groove 262 to the outside of the main body 220. More specifically, the second body 264*b* may protrude outward from a surface of the main body 220 in contact with the cover panel 100. The second body 264*b* may be coupled to the support frame 124*b*1 of the holder 124*b* while protruding from the main body 220**.

Cylinders may be installed in the first body **264*a* and the second body 264*b* to support the spring 268. In addition, although not shown, an accommodation hole having a diameter corresponding to the diameter of the outer circumferential surface of the cylinder may be formed in the main body 220 to be used as a movement passage for the cylinder installed in the first body 264*a* and the second body 264*b*. Accordingly, the knob 264 may move in the longitudinal direction of the main body 220 inside the second groove 262**.

The third body **264*c* may be provided in a bent shape at an end portion of the second body 264*b*. The third body 264*c* may be movably disposed inside the holder 124*b* of the first coupling part 124. More specifically, the third body 264*c* may come into contact with the inner surface of the holding frame 124*b*2 of the holder 124*b***.

As shown in FIG. 5, the length of the surface of the third body **264*c* in contact with the inner surface of the holding frame 124*b*2 may be shorter than the length of the inner surface of the holding frame 124*b*2 in contact with the third body 264*c*. Therefore, when the third body 264*c* is accommodated inside the holding frame 124*b*2, a phenomenon in which the second body 264*b* does not come into contact with the inner surface of the holding frame 124*b*2 and is separated from the inner surface of the support frame 124*b*1** can be prevented.

A support block 266 may be disposed inside the second groove 262. The support block 266 may support one end and the other end of the first body **264*a* of the knob 264. The support block 266 may be disposed to overlap one end portion and the other end portion of the first body 264*a* to prevent the knob 264 from escaping to the outside of the main body 220**.

As shown in FIG. 5, the spring 268 may be disposed inside the second groove 262. The spring 268 may cross the cylinders installed in the first body **264*a* and the second body 264*b* of the knob 264**.

The spring 268 may move in conjunction with the movement of the knob 264. More specifically, the spring 268 is compressed when the first body **264*a* of the knob 264 is pressed, and returns to its original state when the pressing force of the first body 264*a* disappears, thereby pushing the first body 264*a* of the knob 264 and the second body 264*b* toward the outside of the housing. As a result, the first body 264*a* and the second body 264*b* of the knob 264 may return to an initial state thereof in which the first body 264*a* and the second body 264*b*** are not pressed.

The second conductor 280 may be disposed on a surface of the main body 220 of the multifunction module 200 in contact with the cover panel 100. When the multifunction module 200 is coupled to the cover panel 100, the second conductor 280 may be disposed in the first groove **122*a* and coupled to the first conductor 122*b*. In this case, the second conductor 280 may be disposed on one side and the other side of the first conductor 122*b*. The second conductor 280 may be a tension spring 268** but is not limited thereto.

As shown in FIG. 6, the second conductor 280 may be connected to a second wire W2 disposed inside the multifunction module 200. When the first conductor **122*b* and the second conductor 280 are coupled, a current flowing in the first wire W1 is transferred to the second wire W2 through the first conductor 122*b* and the second conductor 280, thereby the multifunction module 200** may be operated.

Although not shown, the multifunction module 200 of the cockpit module assembly 1 for a vehicle according to the embodiment of the present invention may be connected to a control device disposed inside the vehicle. The control device may control the multifunction module 200 based on a signal transmitted from a manipulation system. The signal transmitted to the control device is the state of power supplied to the multifunction module 200, the instrument information of the vehicle collected by the multifunction module 200 (e.g., accelerator/brake pedal contact state, vehicle door open state, seat belt fastening state, battery charge amount, driving speed, transmission gear shift lever position state, emergency switch state or start key input state) or the charging state, voltage state of the convenience device CA coupled to the multifunction module 200, or an operating state of the convenience device CA (e.g., humidification state, dehumidification state, mobile device mounting state, mobile device charging state, or operating state of a display), and the like.

Hereinafter, a process of attaching and detaching the multifunction module 200 to and from the cover panel will be described in detail.

Referring FIGS. 1 to 6, first, when the user presses the first body 264*a* of the knob 264 toward the inside of the main body 220 while holding the multifunction module 200, the first body 264*a* is pushed inward of the main body 220 from the inside of the second groove 262. Accordingly, the second body 264*b* and the third body 264*c* are also pushed inward of the main body 220 from the inside of the second groove 262 in conjunction with the movement of the first body 264*a*. Also, the spring 268 may be compressed in a direction inward of the main body 220.

Next, in a state in which the first body 264*a* of the knob 264 is pushed by the user's manipulation, when the user arranges the third body 264*c* of the knob 264 inside the holding frame 124*b*2 of the holder 124*b* of the cover panel 100, the second conductor 280 of the multifunction module 200 may be coupled to the first conductor 122*b* of the power supply 122 of the cover panel 100. The second conductor 280 coupled to the first conductor 122*b* is disposed inside the first groove 122*a* formed in the first cover 120 of the cover panel 100. At this time, the second body 264*b* of the knob 264 is spaced apart from the support frame 124*b*1 of the holder 124*b*, and the third body 264*c* of the knob 264 comes into contact with the inner surface of the holding frame 124*b*2.

Finally, when a user pressing the first knob 264 releases the state of pressing the first knob 264, the spring 268 returns to its original state due to the elastic force of the compressed spring 268. Accordingly, the first body 264*a* and the second body 264*b* of the knob 264 are moved to a position at which the first body 264*a* and the second body 264*b* are not pressed, so that the second body 264*b* may be supported by being in contact with the support frame 124*b*1. Accordingly, the multifunction module 200 may be coupled to the cover panel 100.

Conversely, when the user presses the first body 264*a* of the knob 264 of the multifunction module 200 while the multifunction module 200 is coupled to the cover panel 100, as the first body 264*a* is pushed, the second body 264*b* of the knob 264 is spaced apart from the support frame 124*b*1 of the holder 124*b* of the cover panel 100.

In a state in which the second body 264*b* of the knob 264 is spaced apart from the support frame 124*b*1, when the user lifts the multifunction module 200 in a direction from the floor to the ceiling of the vehicle, the third body 264*c* of the knob 264 is separated outward from the inside of the holding frame 124*b*2 so that the knob 264 is separated outward from the cover panel 100. At the same time, the state in which the second conductor 280 of the multifunction module 200 is coupled to the first conductor 122*b* is released. Accordingly, the multifunction module 200 can be decoupled from the cover panel 100.

As described above, in the cockpit module assembly 1 for a vehicle according to the embodiment of the present invention, when the multifunction module 200 is coupled to the cover panel 100, physical connection and electrical connection can be simultaneously performed. Accordingly, time consumption for separate physical connection and electrical connection between the multifunction module 200 and the cover panel 100 can be reduced.

In addition, in the cockpit module assembly 1 for a vehicle according to the embodiment of the present invention, since the need to reconfigure the entire cockpit module for a new design is reduced, development time and manufacturing time can be reduced.

According to an embodiment of the present invention, since a user can customize a multifunction module in which components for displaying instruments and components for holding or charging portable devices are grouped, the degree of freedom in design and user convenience can be improved.

In addition, since the multifunctional module can be detachably coupled to the cover panel and the user can freely change the desired type of module, the cost and time for newly manufacturing a cockpit module to be installed in a new vehicle can be reduced.

Although the above has been described with reference to embodiments of the present invention, it should be understood that those skilled in the art can variously modify and change the present invention within the scope not departing from the spirit and scope of the present invention described in the claims below. Also, it should be construed that the differences related to these modifications and changes are included in the scope of the present invention, which is defined in the appended claims.

What is claimed is:

1. A cockpit module assembly for a vehicle, comprising:

a cover panel disposed to face toward a ceiling surface of a vehicle and covering one side of an instrument panel; and a multifunction module detachably coupled to the cover panel and provided to at least one of display instrument information of the vehicle, hold one or more portable devices or any combination thereof, wherein the cover panel includes:

a first cover disposed adjacent to a steering wheel; and a second cover disposed adjacent to a glove box, and wherein the first cover is disposed higher than the second cover in a direction from a floor surface of the vehicle to the ceiling surface.

2. The cockpit module assembly of claim 1, wherein the first cover includes:

a power supply disposed in a central portion thereof; and a first coupling part disposed on first and second sides of the power supply.

3. The cockpit module assembly of claim 2, wherein the power supply includes:

a first groove formed in a direction from an outer surface of the cover panel toward the floor surface of the vehicle; and a first conductor disposed in the first groove and protruding toward an open side of the first groove.

4. The cockpit module assembly of claim 2, wherein the first coupling part includes:

a hole formed to pass through the cover panel; and a holder disposed in the hole, wherein the holder includes a support frame coupled to the hole, and a holding frame connected to the support frame and disposed inside the cover panel.

5. The cockpit module assembly of claim 4, wherein the multifunction module includes:

a main body in contact with the cover panel;

a plurality of holding parts disposed on an outer surface of the main body and configured to hold the one or more portable devices;

a second coupling part disposed on both sides of the main body and coupled to the first coupling part; and a second conductor disposed on a surface of the main body in contact with the cover panel, the second conductor disposed in the first groove and coupled to the first conductor.

6. The cockpit module assembly of claim 5, wherein the second coupling part includes:

a second groove formed inward of the main body;

a knob disposed inside the second groove;

a support block disposed inside the second groove and supporting the knob; and a spring disposed inside the second groove and disposed on one side of the knob to move in conjunction with movement of the knob.

7. The cockpit module assembly of claim 6, wherein the knob includes:

a first body disposed inside the second groove and exposed to an outside of the main body;

a second body disposed inside the second groove and protruding from an inside of the second groove to the outside of the main body; and a third body provided in a bent shape at an end portion of the second body and movably disposed inside the holder of the first coupling part.

8. A multifunction module for a vehicle, the vehicle including a cover panel disposed to face toward a ceiling surface of the vehicle and covering a side of an instrument panel, the multifunction module comprising:

a main body detachably attachable to the cover panel, wherein the multifunction module is configured to at least one of display instrument information of the vehicle, hold one or more portable devices or any combination thereof;

one or more holding parts disposed on an outer surface of the main body and configured to hold the portable device, the instrument or the combination thereof;

one or more coupling parts disposed on one or more sides of the main body for attachment to the cover; and one or more conductors disposed on a surface of the main body such that upon attachment of the multifunction module to the cover, the one or more conductors of the multifunction module are connected to one or more conductors of the cover panel, wherein the cover panel is electrically connected to the vehicle and the one or more portable devices are able to receive power via the cover panel.

9. The multifunction module of claim 8, wherein the one or more coupling parts include:

a groove formed inward of the main body;

a knob disposed inside the groove;

a support block disposed inside the groove and supporting the knob; and a spring disposed inside the groove and disposed on one side of the knob to move in conjunction with movement of the knob.

10. The multifunction module of claim 9, wherein the knob includes:

a first body disposed inside the groove and exposed to an outside of the main body;

a second body disposed inside the groove and protruding from an inside of the groove to the outside of the main body; and a third body provided in a bent shape at an end portion of the second body and movably disposed inside a holder of a coupling part of the cover panel.

* * * * *